United States Patent [19]

Tregoning

[11] 4,090,768

[45] May 23, 1978

[54] ADAPTOR BACK-SHELL FOR CABLE-ASSEMBLY JUNCTIONS

[76] Inventor: William Leonard Tregoning, 185 Quincy Shore Dr., North Quincy, Mass. 02171

[21] Appl. No.: 761,405

[22] Filed: Jan. 21, 1977

Related U.S. Application Data

[63] Continuation-in-part of Ser. No. 730,215, Oct. 6, 1976.

[51] Int. Cl.[2] .................... H01R 13/34; H01R 13/36; H01R 43/02; B23K 35/14

[52] U.S. Cl. .................................. 339/143 R; 29/628; 164/47; 164/98; 174/35 C; 174/75 C; 228/56; 228/246; 228/255; 339/275 R

[58] Field of Search ................ 174/35 C, 75 R, 75 C, 174/76, 78, 88 C; 29/628, 629; 228/179, 56, 57, 245, 246, 249, 253, 255; 339/143 R, 275 R, 275 T; 285/287, 294, 297; 403/272

[56] References Cited

U.S. PATENT DOCUMENTS 599,558 2/1898 Greenfield ...................... 285/294 X

FOREIGN PATENT DOCUMENTS 2,439,717 3/1976 Germany ............................ 285/287

*Primary Examiner*—Laramie E. Askin

*Attorney, Agent, or Firm*—Russell & Nields

[57] ABSTRACT

The invention relates to shielded cables and in particular to an electrically conductive junction between the conduit which shields the cable and the electrical connector at the end of the cable which serves as the cable termination. The invention comprehends an adapter back-shell for this junction which is a simple solder casting.

4 Claims, 13 Drawing Figures

ADAPTOR BACK-SHELL FOR CABLE-ASSEMBLY JUNCTIONS

This application is a continuation-in-part of my co-pending application Ser. No. 730,215 filed Oct. 6, 1976.

BACKGROUND OF THE INVENTION

Cable assemblies having multiple conductors frequently are provided with RFI (radio frequency interference) shielding of EMI (electromagnetic interference) shielding, and this shielding may be a braided conduit or a flexible metal conduit. Such cable assemblies frequently are also subject to EMC (electromagnetic compatability) requirements. A typical braided conduit is tin over copper, in which wires or thin filaments of tin over copper are braided to form the conduit. Another typical material is stainless steel. The electrical connector termination typically has a plurality of apertures to receive each wire in the cable assembly. Moreover, in order to make the connection between the individual wire and the aperture therefor, provision must be made which tends to occupy additional space, sometimes involving jumper connections. The electrical connector termination thus has an outside diameter which is substantially greater than that of the cable. These cables are useful in the aerospace commerical program and elsewhere.

In the present art one method of connecting the braided shielding of the cable assembly to the electrical connector is as follows. An additional length of braided conduit is fitted in part snugly over one end of the connector and also partly placed in contact with the regular braided conduit and soldering connections are made. Measurements of connections such as these have indicated resistance as high as 24 ohms. Thus the connection is unsatisfactory and it is also somewhat cumbersome to apply.

A second technique is the use of a back-shell adaptor which involves a substantial length of rigid metal-like material, one end of which is provided with means to grasp the braided conduit and the other end of which screws over the electrical connector. This provides highly efficient shielding but the shielding costs are relatively high. Furthermore, dimensional requirements are severe in that the outer diameter of the back shell cannot exceed the other diameter of the connector, and this requirement frequently leaves insufficient room inside the back shell.

In my said co-pending application Ser. No. 730,215, I have disclosed a method in which a conductive connection is molded directly onto the electrical connector and braided conduit shielding the cable assembly. However, some manufacturers wish to put terminations on cables at their own factories, and it makes this operation easier if they can purchase as a component part a single, simple component which then can be used in their manufacturing procedures.

SUMMARY OF THE INVENTION

This invention is related to said co-pending application Ser. No. 730,215, in that it is used for the same purpose. However, this invention is a single, simple component part which may be purchased by cable manufacturers, etc. for use in their own manufacturing procedures.

The article of the invention is an adaptor back-shell which is a single, simple solder casting. In one embodiment of the invention the casting is entirely solder. In another embodiment of the invention the solder is cast onto a threaded fitting of tinned brass or other rigid material.

DETAILED DESCRIPTION OF A PREFERRED EMBODIMENT

The invention may best be understood from the following detailed description thereof, having reference to the accompanying drawings in which.

Figure 1:
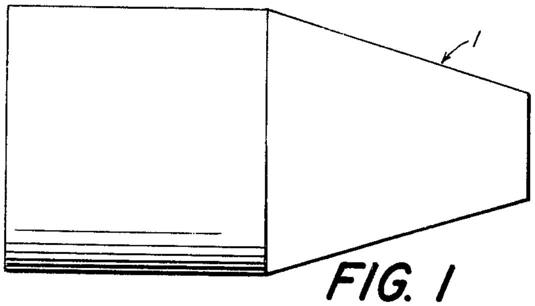
FIG. 1 is a side view of one embodiment of the adaptor back-shell of the invention.
Figure 2:
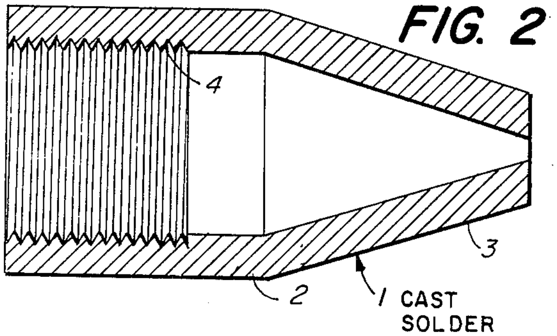
FIG. 2 is a central longitudinal sectional view of the adaptor back-shell of FIG. 1.

Referring to the drawings and first two FIGS. 1 and 2 thereof, in the embodiment of the invention therein shown the adaptor back-shell 1 is a molded part comprising solder. Any suitable solder material may be used, such as silver, or a combination of lead and tin in a 60-40 or 40-60 proportion.

In this embodiment of the invention, the entire adaptor back-shell 1 is cast out of solder. The adaptor back-shell 1 includes a tubular part 2 of cylindrical configuration and a conical part 3. The tubular part 2 has threads 4 molded into its inner surface. That is to say, when the adaptor back-shell 1 is cast, the mold used has a threaded surface which forms the threads 4 on the inner surface of the tubular part 2, as described hereinafter in connection with FIG. 3. The conical part 3 extends away from the tubular part 2 until the inner aperture of the conical part 3 is very small. The inner diameters of the tubular part 2, and the depth and pitch of the threads 4 are such that they conform with threads of standard connector plugs and other terminations. While the adaptor back-shell of my invention is not limited to any particular dimensions, a respresentative adaptor back-shell cast in accordance with the invention might have a thickness of $\frac{1}{4}$ inch and an overall length of 2 inches of which 1 inch might comprise the length of the tubular part 2.

Figure 3:
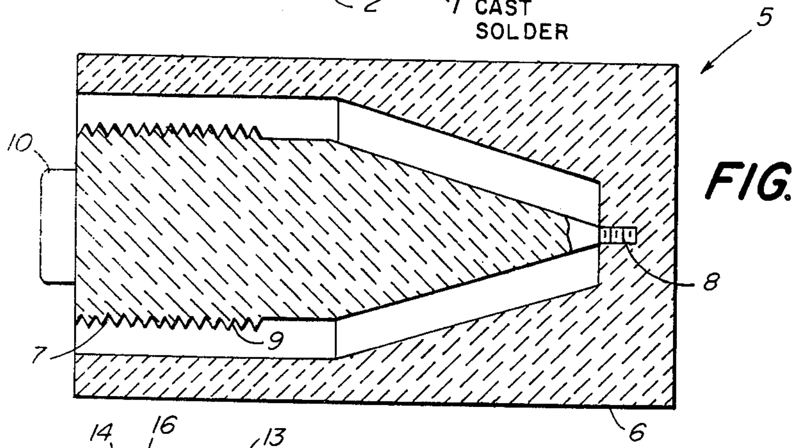
FIG. 3 is a central longitudinal sectional view of a mold for casting the adaptor back-shell of FIGS. 1 and 2.

Referring now to FIG. 3, the adaptor back-shell of FIGS. 1 and 2 is manufactured by simple casting in a mold. As shown in FIG. 3, a suitable mold 5 may comprise suitable refractory material in two parts, 6 and 7. The outer part 6 conforms in general to the outer dimensions of the desired adaptor back-shell. The inner part 7 is a mandrel which rests in a suitable socket 8 in the outer part 6. The mandrel 7 is threaded as shown at 9 and beyond the threaded section there is tip 10 to permit grasping for rotational movement after the adaptor backshell has been cast. The molten solder may be poured into the mold at its upper extremity, and after the solder has solidified the mandrel 7 is unscrewed by means of the tip 10 and removed, and the finished adaptor back-shell may then easily be removed from the outer part 6 of the mold 5.

Figure 4:
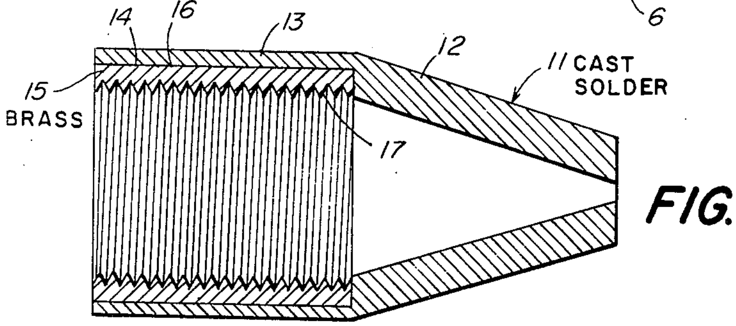
FIG. 4 is a view, similar to that of FIG. 2, showing a second embodiment of the adaptor back-shell of the invention.

A second embodiment of the invention is shown in FIG. 4. The adaptor back-shell 11 shown in FIG. 4 includes a solder portion 12 which is similar to the adaptor back-shell 1 shown in FIGS. 1 and 2 except that the inner surface of the tubular portion 13 is not threaded. Rather, the cylindrical end 13 of the adaptor back-shell 11 is provided with a recess 14 extending over its inner surface. Within this recess 14 there is provided a tubular ring or annulus 15 of brass or other material, the outer surface 16 of which is pre-tinned or otherwise treated prior to being affixed to the solder portion 12 of the adaptor back-shell 11 for suitable adherence thereto. The inner surface 17 of the tubular annulus 15 is threaded, the dimensions of the threads 17 being similar to those of the threads 4 in the embodiment shown in FIGS. 1 and 2.

Figure 5:
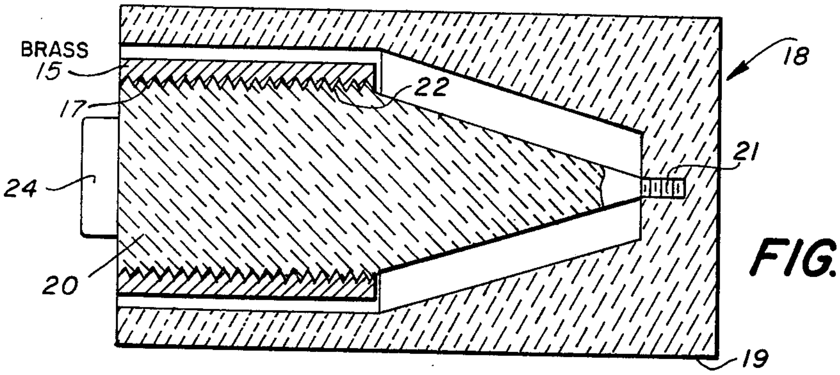
FIG. 5 is a view, similar to that of FIG. 3, showing a mold for casting the adaptor back-shell of FIG. 4.

In casting the adaptor back-shell of FIG. 4, the mold of FIG. 3 is modified as shown in FIG. 5. The mold 18 of FIG. 5 is similar to the mold of FIG. 3 in that it has an outer part 19 and an inner part or mandrel 20. The mandrel 20 fits into a suitable socket 21. The upper portion of the mandrel 20 is threaded, as shown at 22, and the brass annulus 15 is screwed onto the upper portion of the mandrel 20 prior to filling the mold 18 with solder, the threads 17 of the brass annulus 15 engaging the threads 22 of the mandrel 20. After the brass ring 15 has been screwed onto the mandrel 20, the mold 18 is filled with solder. As previously mentioned, before placement in the mold 18 the outer surface of the brass ring 15 is tinned so that the molten solder will adhere thereto. After the solder has solidified, the mandrel is removed by grasping the tip 24, and the finished adaptor back-shell 11 may then be removed from the mold 18.

The manufacturer who purchases an adaptor back-shell of the invention as a component part uses it in the following manner.

Figure 7:
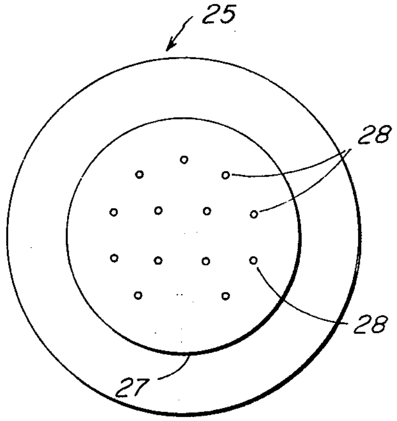
FIG. 7 is an end view of the connector plug shown in FIGS. 6A – 6E.
Figure 6A:
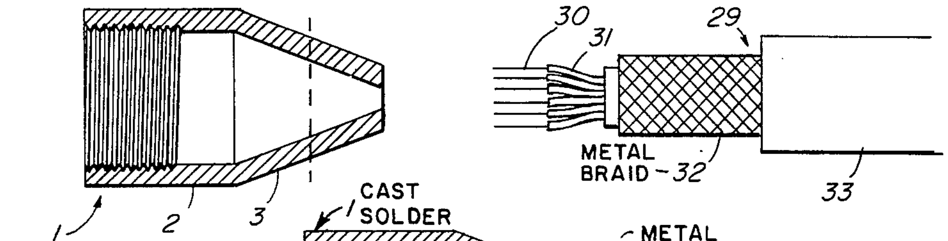
FIGS. 6A – 6E are views showing the sequence of steps involved in the application of the adaptor back-shell of the invention to a cable-assembly junction.
Figure 6B:
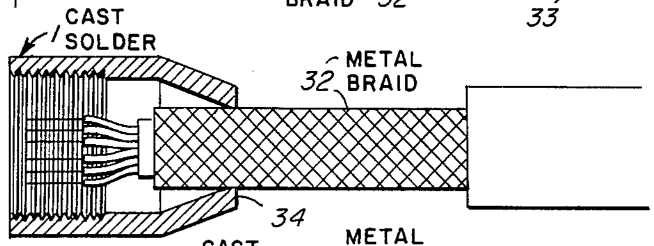
Figure 6C:
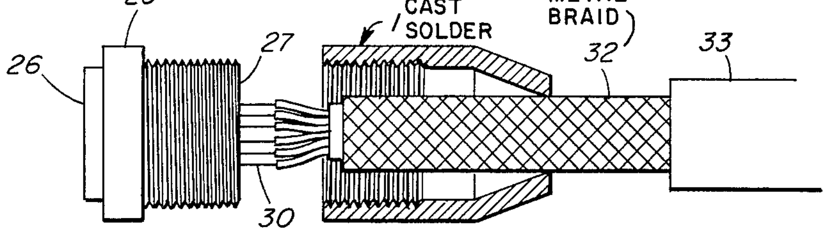

Referring now to FIG. 6C, therein is shown a connector plug 25 into which the ends of the conductors of the multiconductor cable are to be fitted. The connector plug includes a face section 26 which is adapted to be connected to another connector plug, or termination on a chassis, or any other suitable connection. The connector plug 25 also includes a back section 27 having a plurality of apertures adapted to receive the conductors of the multi-conductor cable. The apertures 28 are shown in FIG. 7. The back section 27 of the connector 25 is threaded in the conventional way, since such connector plugs are of standard design and are adapted to be screwed into back-shells which are also available on the market.

In accordance with conventional cable techniques, the cable 29 contains a multiplicity of conductors 30, each of which has its own insulation 31. Each conductor 30 is adapted to be inserted into a corresponding aperture 28 in the connector plug 25. For uses which require shielding against radio frequency interference and electromagnetic interference, these insulated conductors 30 must be wrapped in a suitable shield of conducting material. Such a shield is shown at 32 and conventionally comprises a multiplicity of fine wires which are braided or otherwise formed into a suitable conductive covering for the cable. Such fine wires are typically copper, the surface of which has been tinned. Surrounding the shield 32 is an overall cable jacket 33 of insulating material.

A manufacturer wishing to make use of the adaptor back-shell of the invention, first custs off the conical portion 3 of the adaptor back-shell 1 at a zone where the inner diameter of the conical portion 3 is slightly greater than the outer diameter of the shield 32 on the cable. This step is shown in FIG. 6A.

Next, the manufacturer slips the adaptor back-shell 1 over the cable 29 as shown in FIG. 6B so that the truncated extremity 34 extends over the cable shield 32. This step is shown in FIG. 6B.

Next the manufacturer connects the conductors 30 of the cable to the connector plug 25. In so doing each conductor 30 is inserted into an electrically conductive tube in a corresponding aperture 28 by techniques which are well-known in the art. When connected, the cable and connector plug assembly appear as shown in FIG. 6C. The overall cable jacket 33 has been removed for a certain length from the end of the cable so as to expose the overall cable shield 32. The overall cable shield 32 in turn has been removed at the extremity of the cable so as to expose the insulated conductors 30 to permit handling thereof and insertion into the apertures 28 in the connector plug 25. This step is shown in FIG. 6C.

Figure 6D:
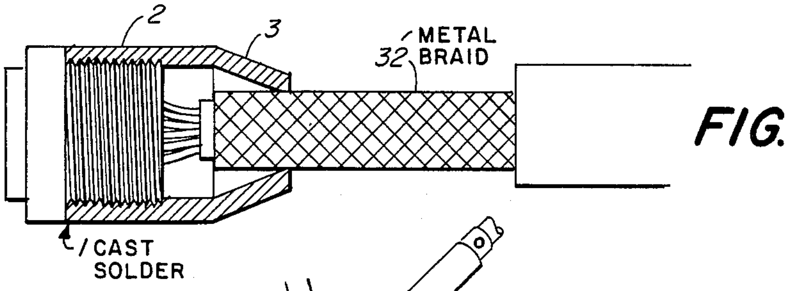

Next the manufacturer screws the cylindrical portion 2 of the adaptor back-shell 1 onto the back section 27 of the connector 25, insuring that the conical end 3 now comes up towards the end of the cable shield 32 but remaining on the outside thereof. This step is shown in FIG. 6D.

Figure 6E:
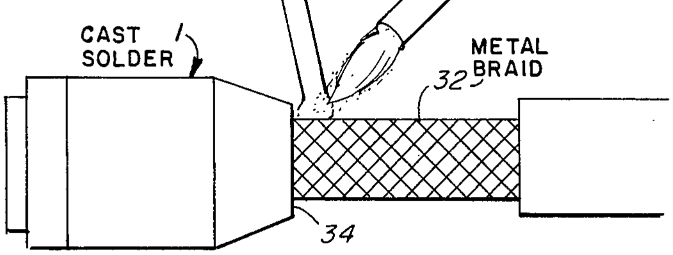

The manufacturer then heats the truncated end 34 of the adaptor back-shell 1 so that the solder melts and flows onto the cable shield 32. If necessary, additional solder may be added at this point. The space to be filled is only about 1/16 of an inch, so that this is readily accomplished. The adaptor back-shell of the invention is of substantial thickness so that there is a substantial amount of solder available. Nevertheless, as indicated, additional solder may be supplied if needed. This step is shown in FIG. 6E.

The word "solder" herein is used in its conventional sense and refers to any of various fusible alloys, usually tin and lead, used to join metallic parts when applied in the melted state to the solid metal. That is to say, solder is a fusing metal or alloy used to unite adjacent surfaces of less fusible metals or alloys.

Figure 8:
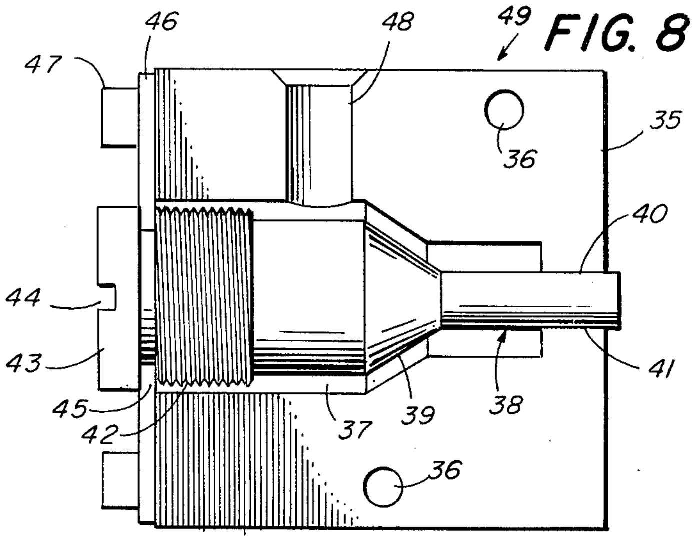
FIG. 8 is a view, similar to that of FIG. 3, showing a mold for casting still another embodiment of the adaptor back-shell of the invention.

Referring now to FIG. 8, therein is shown a mold 49 for casting still another embodiment of the adaptor back-shell of the invention. The outer part of the mold 49 may comprise two halves, one of which is shown in FIG. 8 at 35. Said mold half 35 includes sockets 36. The other half of the outer part of the mold 49 (not shown) is identical to the half 35 except that it is equipped with posts (not shown) which cooperate with the sockets 36 to align the two halves of the mold 49 properly. The mold 49 includes a central cavity 37 which receives a mandrel 38. The mandrel 38 differs from the mandrel 7 of FIG. 3 in that the conical portion 39 of the mandrel 38 is truncated and terminates in an extended cylindrical portion 40 which fits into a socket 41 in the outer part of the mold 49. As in the other embodiments of the invention, the mandrel 38 includes a threaded section 42. Beyond the threaded section there is a tip 43 having a slot 44 to permit grasping for rotational movement after the adaptor back-shell has been cast. The tip 43 also includes a recess 45 adapted to receive the two halves of a top plate 46 which is removably affixed to the outer part of the mold 49 by screws 47. When assembled, the mold 49 has the configuration shown in FIG. 8. Molten solder is poured into an aperture 48 in the mold 34 until it is seen that the mold has been filled. After cooling, the screws 47 are unscrewed and the top plate 46 is slidably removed from around the recess 45. The mandrel 38 may then be removed by unscrewing the mandrel from the cast adapter back-shell by means of the slot 44. The finished adaptor back-shell is then easily separated from the outer part of the mold. The configuration of this adaptor back-shell can readily be seen from the mold of FIG. 8. Unlike the adaptor back-shells in the other embodiments of this invention, the adaptor back-shell formed by the mold of FIG. 8 is not designed to have its conical portion cut off. Rather, adaptor back-shells of the form of FIG. 8 are designed so as roughly to approximate the needs of the manufacturer and the extended cylindrical portion is so dimensioned as to provide a snug fit around the shield of the cable to which it is to be attached. However, with the exception of the initial step of cutting off the conical portion 3, the manufacturer makes use of the adaptor back-shell formed by the mold of FIG. 8 in essentially the same manner as is shown in FIGS. 6A – 6E.

Figure 9:
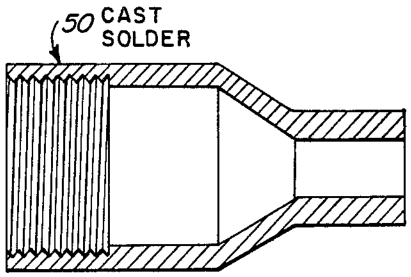
FIG. 9 is a central longitudinal sectional view of an adaptor back-shell produced by the mold of FIG. 8.

The adaptor back-shell formed by the mold of FIG. 8 is shown in FIG. 9 at 50.

Having thus described the principles of the invention together with illustrative embodiments thereof, it is to be understood that although specific terms are employed, they are used in a generic and descriptive sense and not for purposes of limitation, the scope of the invention being set forth in the following claims.

I claim:

1. Adapter back-shell for cable-assembly junctions comprising a unitary tubular member having an internally threaded cylindrical portion and a substantially conical portion joined directly to said cylindrical portion and tapering from said cylindrical portion to a small-diameter end, said unitary member consisting entirely of cast solder, the diameter of said small diameter end being substantially less than that of said cylindrical portion as a result of said taper.

2. Adapter back-shell in accordance with claim 1, wherein said unitary tubular member also includes an extended tubular member at the small diameter end of said substantially conical portion adapted to embrace the shield of a cable.

3. Adapter back-shell in accordance with claim 1, wherein said substantially conical portion comprises a conical portion which is truncated at a first zone near the apex of the cone and which is adapted for truncation at a second zone more remote from said apex.

4. Adapter back-shell for cable-assembly junctions comprising a unitary tubular member having an internally threaded cylindrical portion and a substantially conical portion, said unitary member consisting entirely of cast solder except in the vicinity of the threads, said threads being formed in the inner surface of an annulus of rigid material the outer surface of which is adhered to said solder.

* * * * *